(12) United States Patent
Ullrich et al.

(10) Patent No.: US 8,157,296 B2
(45) Date of Patent: Apr. 17, 2012

(54) HIGH-TENSILE PLUG-IN CONNECTOR

(75) Inventors: Markus Ullrich, Baden-Baden (DE);
 Daniel Buchmuller, Au am Rhein (DE);
 Stefan Welle, Hugelsheim (DE); Holger Ullrich, Elchesheim-Klingen (DE)

(73) Assignee: Eaton Fluid Power GmbH, Baden-Baden (DE)

( * ) Notice: Subject to any disclaimer, the term of this patent is extended or adjusted under 35 U.S.C. 154(b) by 544 days.

(21) Appl. No.: 11/718,022

(22) PCT Filed: Oct. 21, 2005

(86) PCT No.: PCT/EP2005/011346
 § 371 (c)(1),
 (2), (4) Date: Jun. 25, 2009

(87) PCT Pub. No.: WO2006/045553
 PCT Pub. Date: May 4, 2006

(65) Prior Publication Data
 US 2009/0256354 A1 Oct. 15, 2009

(30) Foreign Application Priority Data
 Oct. 28, 2004 (DE) .......................... 10 2004 052 475

(51) Int. Cl.
 *F16L 37/00* (2006.01)
(52) U.S. Cl. .................. 285/321; 285/305; 285/322
(58) Field of Classification Search .................. 285/305, 285/321, 314, 322
 See application file for complete search history.

(56) References Cited

U.S. PATENT DOCUMENTS

| | | | | |
|---|---|---|---|---|
| 5,568,946 A | * | 10/1996 | Jackowski | 285/308 |
| 5,570,910 A | | 11/1996 | Highlen et al. | |
| 5,730,475 A | * | 3/1998 | Kargula | 285/321 |
| 5,829,792 A | * | 11/1998 | Nordstrom | 285/321 |
| 6,082,779 A | * | 7/2000 | Lesser et al. | 285/319 |
| 6,155,612 A | * | 12/2000 | Szabo | 285/319 |

(Continued)

FOREIGN PATENT DOCUMENTS

WO WO93/20379 10/1993

(Continued)

OTHER PUBLICATIONS

International Search Report mailed Feb. 22, 2006 in Priority Application PCT/EP2005/011346., (3 of 4 pages translated).

*Primary Examiner* — David E Bochna
(74) *Attorney, Agent, or Firm* — Dykema Gossett PLLC

(57) ABSTRACT

A connector device comprising a connector socket, a connector housing, and a connector plug. In an embodiment, the connector socket and connector plug may be configured so that they can be formed, for example, on pipe ends in a cold-forming process. The connector housing may be a plastic part that can be produced in an injection-molding process. Detent elements may secure the connector housing to the connector socket. The connector plug in turn may secure the detent elements in a locked position, so that the connector housing cannot become detached from the connector socket as long as the connector plug remains in the socket. A locking ring can secure the connector plug in the connector housing. The locking ring can, if necessary or desired, be located and configured in such a way that it can be moved into a release position with a tool.

19 Claims, 6 Drawing Sheets

U.S. PATENT DOCUMENTS

| | | | |
|---|---|---|---|
| 6,318,764 B1 * | 11/2001 | Trede et al. | 285/305 |
| 6,371,529 B1 * | 4/2002 | Szabo et al. | 285/319 |
| 6,428,055 B1 * | 8/2002 | Moretti et al. | 285/305 |
| 6,517,120 B1 * | 2/2003 | Miyajima et al. | 285/305 |
| 6,749,231 B2 * | 6/2004 | LeMay et al. | 285/321 |
| 6,905,143 B2 * | 6/2005 | Klinger et al. | 285/305 |
| 7,497,480 B2 * | 3/2009 | Kerin et al. | 285/305 |
| 2003/0178844 A1 | 9/2003 | Klinger | |

FOREIGN PATENT DOCUMENTS

| | | |
|---|---|---|
| WO | WO2005086823 A2 | 9/2005 |

\* cited by examiner

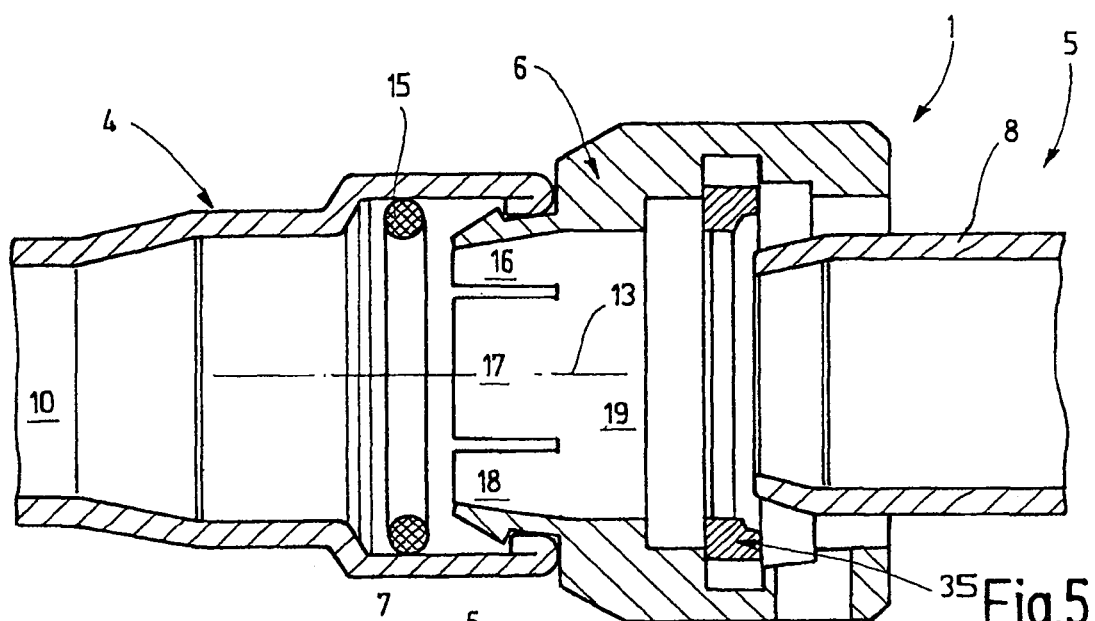
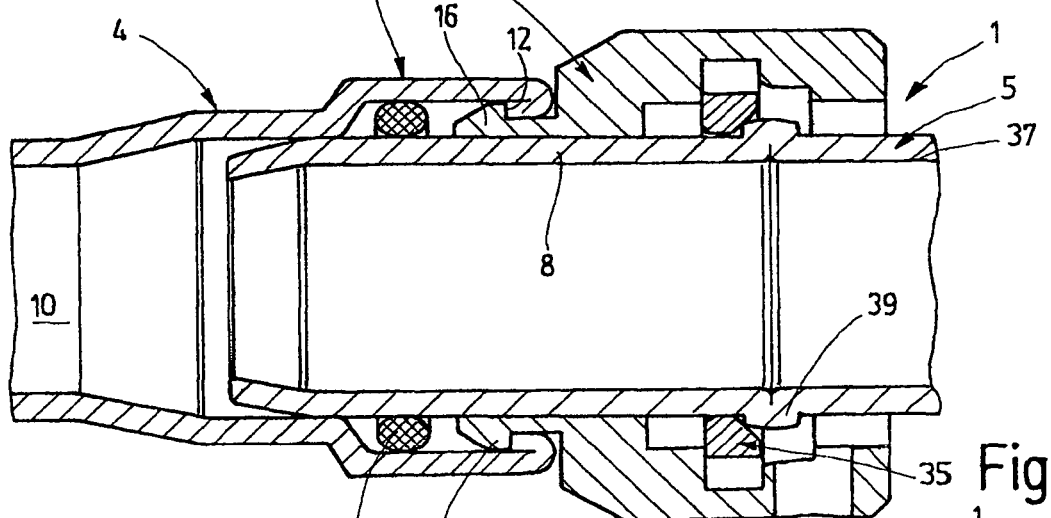
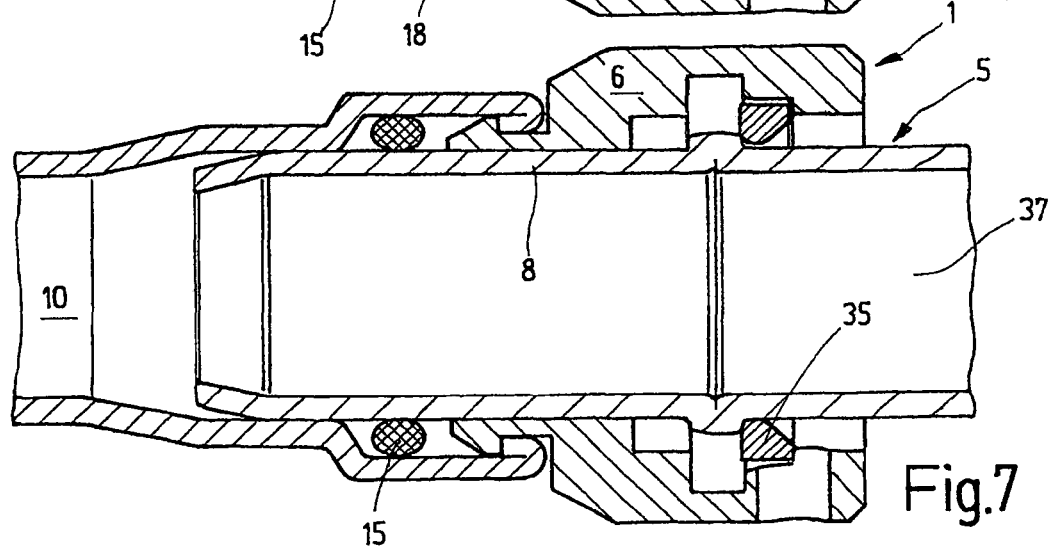

HIGH-TENSILE PLUG-IN CONNECTOR

TECHNICAL FIELD

The invention relates to a connector device for fluid conduits.

BACKGROUND

For example, referring to automobile technology, connecting and coupling devices for fluid conduits are used, said devices being easy to install and being retained after having been installed.

Document EP 0 845 093 BI discloses a plug-in connector comprising a connector body that has a connecting nipple. Locking means and a sealing ring are supported in the plug-in opening. The plug-in nipple has a cylindrical generated surface that interacts with the sealing means. In addition, said sealing means is provided with an annular rib that cooperates with the locking means. A release sleeve allows the expanding of the locking ring in order to be able to pull the connecting nipple out of the connector body, if necessary.

On its side opposite the connecting nipple, the connector body has an external thread that permits the connection with another, continuing line or another device that is to be connected.

The object of the invention is to improve such a connector device.

This object is achieved in accordance with a connector device in accordance with claim 1.

SUMMARY

The inventive connector device comprises a connector socket that can be manufactured as a separate components such as, for example, as a turned part, a reformed part, an injection-moulded part or the like. In an appropriate manner, said part can be connected with a continuing line. However, the connector socket may also be molded to the end of a line. To achieve this, said end may be widened, for example, in an upsetting and/or rolling operation, and be provided with an inward directed collar. Independent of the manufacturing method, this collar defines an annular shoulder having an abutment surface facing away from the receiving opening. The connector socket is associated with a connector plug that may be designed as a separate part or be moulded to the end of a pipe. Basically, it is represented by a cylindrical pipe section that is provided with a radial projection at a specific distance from the free end of said pipe section. This radial projection may be a soldered-on ring, a crimped collar or any bead that is provided on the end of the pipe.

Due to the simplicity of the shape of the connector socket, as well as of the connector plug, both parts can be manufactured in the easiest manner. Preferably, the manufacture occurs by reforming processes. However, other methods for the manufacture of the desired internal or external shapes, such as attachment by partial dissolution, attachment by soldering, attachment by welding of preformed elements may be taken into consideration.

In order to secure the connector plug in the connector socket in axial direction, a connector housing having a passage opening is provided, through which passage opening the connector plug can be inserted. The connector housing is locked to the connector plug in axial direction. This is achieved with a detent element which connects the connector housing preferably in a non-releasable manner to the connector socket when the connector housing has been assembled.

The connector plug, in turn, is connected to the connector housing by means of a locking means, for example, by means of engagement. In so doing, the connector device can be installed in a particularly easy manner. It is only necessary to first lock the connector housing to the connector socket, whereupon the connector plug is inserted through the connector housing into the receiving opening of the connector socket and locked in the connector housing. The desired fluid connection is thus established.

Referring to a preferred embodiment, the detent element consists preferably of several detent fingers which extend away from the front side of the connector housing. These detent fingers extend behind the shoulder formed to the connector socket and are stopped on said shoulder's abutment surface. At the same time, the minimum of one detent finger—in assembled state of the connector device—abuts against the circumferential surface of the connector plug which defines a gap with the shoulder of the connector socket. Measured in radial direction, the ends of the minimum of one detent finger are thicker than the created gap. As long as the connector plug is seated in the receiving opening of the connector socket, the connector housing is connected to the connector socket in a non-releasable manner. Consequently, the connector plug forms a locking device for the detent element that connects the connector housing to the connector socket.

Preferably, the connector housing is made of plastic material. Preferably, it is a one-piece injection-moulded part that can be manufactured in a simple and cost-effective manner. The detent fingers are preferably connected in one piece to the connector housing. They exhibit a minimal resilience consistent with the material properties of the plastic material and can thus be inwardly resilient in radial direction in order to be locked together with the shoulder of the connector socket.

In relaxed state, these detent fingers are preferably aligned in axial direction. The connector housing can thus be locked to the connector socket and be reasonably securely seated on the connector plug before said plug is inserted. However, it is also possible to configure the detent fingers in such a manner that they, in their inoperative position, are slightly inclined toward the central axis of the passage opening of the connector housing. They will be spread only by inserting the connector plug and are locked in position on the shoulder of the connector plug. This embodiment may be preferred when a simple disassembly of the connector device is desired.

Furthermore, it is possible to provide the shoulder, which is preferably configured as an annular shoulder, with a flat abutment surface that extends at a right angle with respect to the central axis of the passage opening of the connector housing. Then the detent fingers are held in a particularly secure manner. Considering this, said shoulder can also be configured in a slightly conical manner, in which case the angle of the cone opens in outward direction. In this case, the holding effect of the appropriately configured detent fingers on the abutment surface is particularly secure.

Also taken into consideration is a conical configuration of the abutment surface of the shoulder, whereby the cone angle of this cone opens away from the mouth of the receiving opening of the connector socket. This type of oblique shoulder makes it possible that the connector housing can be pulled off the connector socket when the connector plug has been removed from the connector housing, so that the detent fingers can freely spring inward. However, in assembled state, the connector plug blocks the detent fingers so that they are held on the shoulder. Then the connector housing can no longer be pulled off the connector socket.

The locking means for mounting the connector plug in the connector housing is preferably a snap ring located in an annular groove in the passage opening. The snap ring may cooperate with a collar formed on the connector plug or with an outward projecting rib that abuts in axial direction against the snap ring.

To do so, the snap ring preferably has, on its outside, an oblique insertion surface, while it has, on its inside, a straight abutment shoulder. As a result of this, it becomes impossible to pull the connector plug out of the connector housing on account of external forces. However, the snap ring can be expanded, for example, by means of a release tool in order to pull the connector plug out of the connector housing and thus be able to open the connector device.

Preferably, the sealing element acting between the connector socket and the connector plug is located in the connector socket. Consequently, the connector housing merely has a holding function. This allows the specification of generous tolerances regarding the manufacture of the connector housing. The precision required to achieve the desired seal is restricted to the connector socket and to the connector plug.

BRIEF DESCRIPTION OF THE DRAWINGS

Additional details of advantageous embodiments in accordance with the invention are the subject matter of the description. With reference to drawings, the description illustrates inventive embodiments. They show in FIG. 1 a perspective illustration of the connector device in assembled state;

FIG. 5 an illustration, in longitudinal section, of a modified embodiment of the connector device in accordance with the invention, before the insertion of the connector plug in the connector socket;

FIG. 6 an illustration, in longitudinal section, of the connector device in accordance with FIG. 5, during the insertion of the connector plug in the connector socket;

FIG. 7 an illustration, in longitudinal section, of the connector device in accordance with FIGS. 5 and 6, in assembled state;

DETAILED DESCRIPTION

Figure 1:
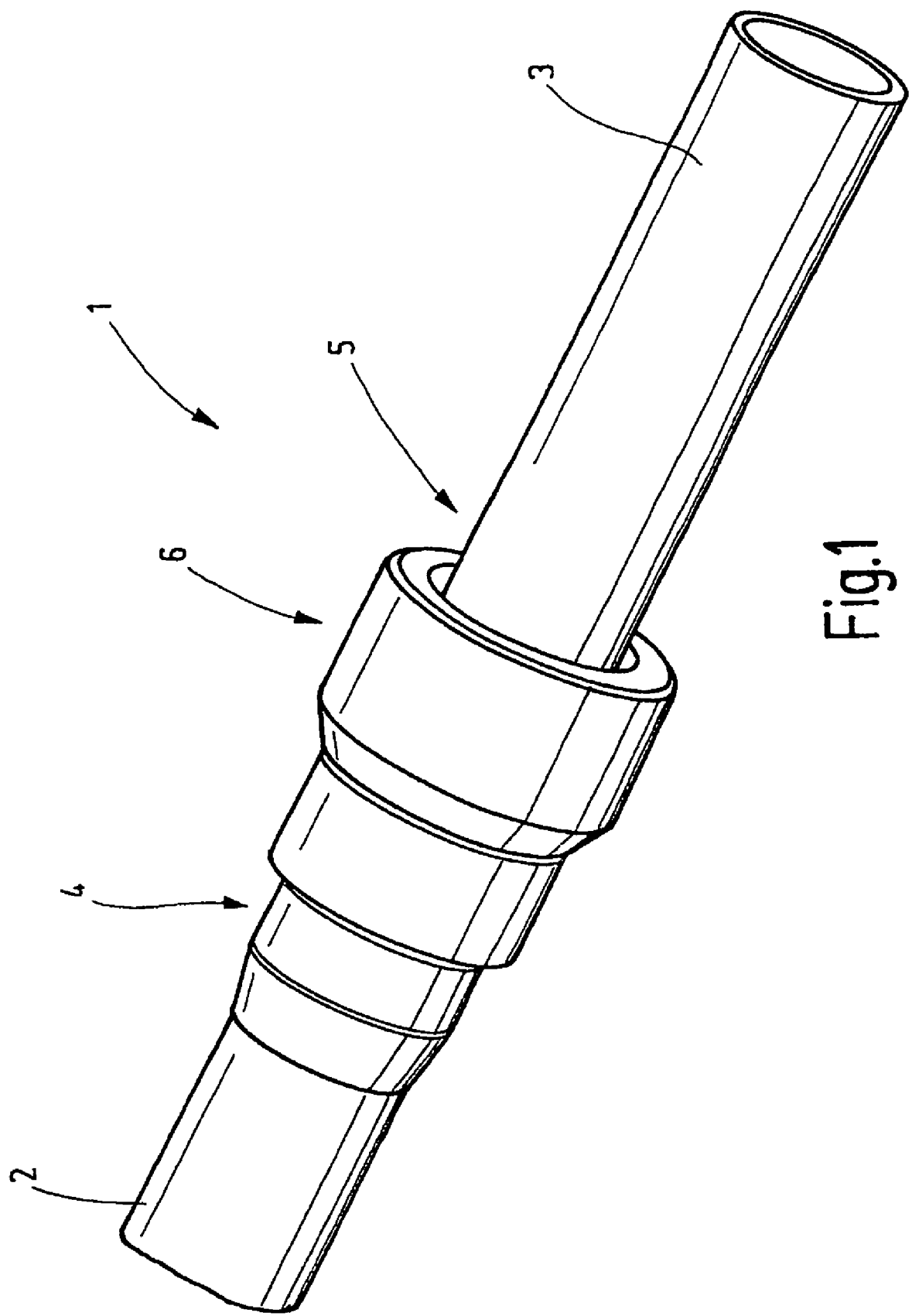

FIG. 1 shows a complete connector device 1 which is disposed to act as the connection between two fluid carrying conduits 2, 3. These conduits may be, for example, pipes of suitable material such as aluminum, steel, copper or the like, or even plastic material. The fluid connection is particularly suitable for high-pressure applications. Line pressures of up to 130 bar and above will be tolerated. The connector device 1 is suitable to absorb the axial forces resulting therefrom, without having the connection open unintentionally. The end of the conduit 2 shown in FIG. 1 represents a connector socket 4, whereas the end of the conduit 3 represents a connector plug 5. A connector housing 6 is provided to lock the connector socket 4 and the connector plug 5 to each other. This is achieved, for example and preferably, by an injection-moulded part of plastic material.

Figure 2:
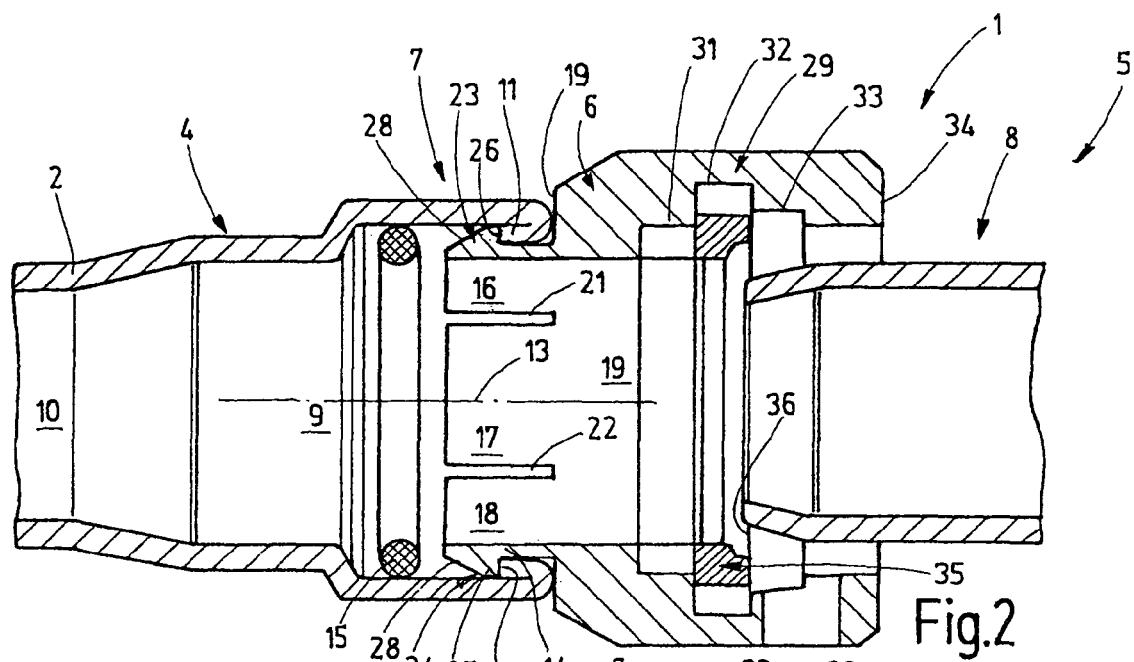
FIG. 2 an illustration, in longitudinal section, of the connector device in accordance with FIG. 1, before insertion of the connector plug.
Figure 3:
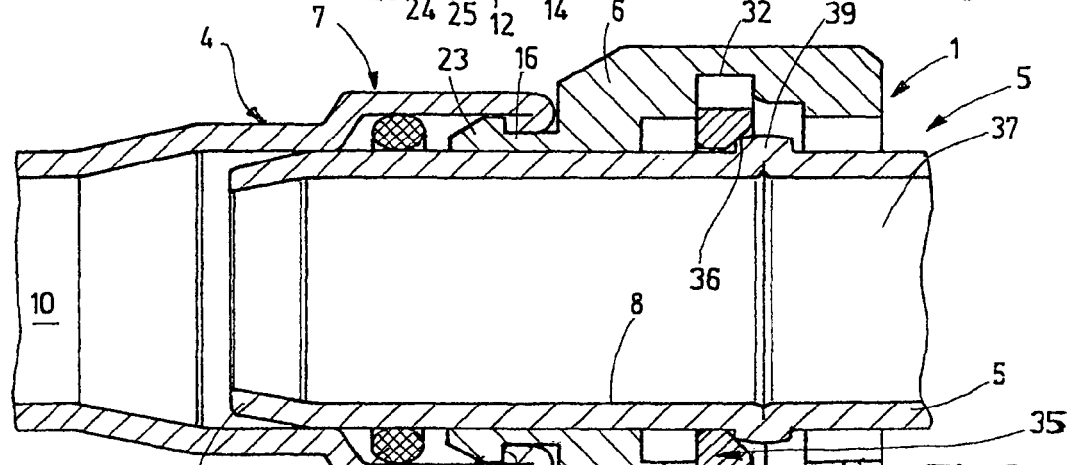
FIG. 3 an illustration, in longitudinal section, of the connector device in accordance with FIG. 1, during the insertion of the connector plug.
Figure 4:
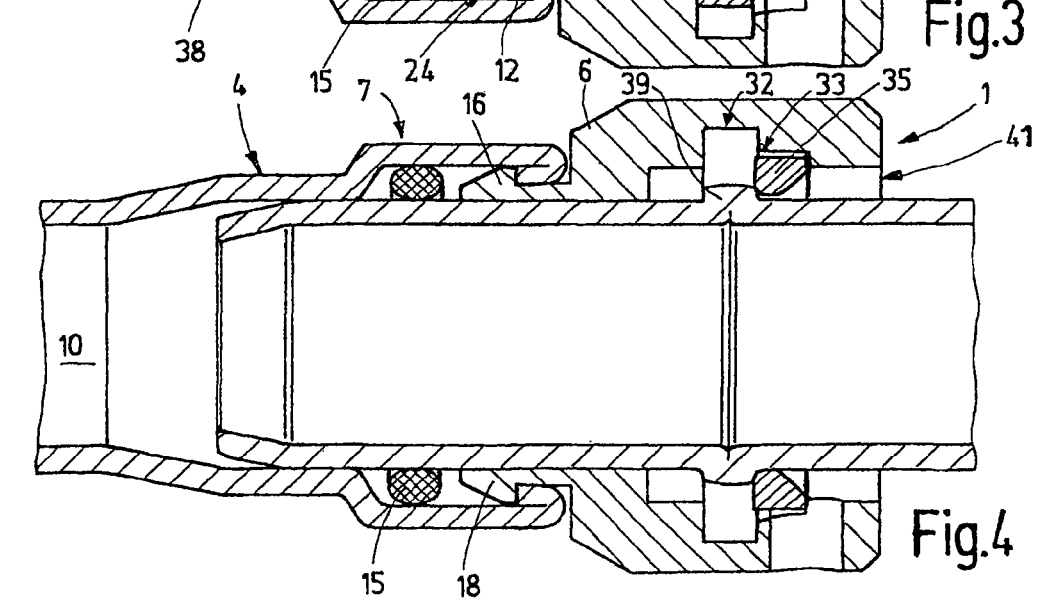
FIG. 4 an illustration, in longitudinal section, of the connector device in accordance with FIG. 1, in assembled state.

The design of the connector device 1 is illustrated in greater detail in FIGS. 2 through 4. The connector socket 4, for example, is moulded to the end of the conduit 2 in that said end is first appropriately expanded, so that a cylindrical section 7 is formed, said cylindrical section having an inside diameter that is greater than the outside diameter of a cylindrical section 8 of the connector plug 5.

The expanded section 7 of the connector socket 4 and an upstream, also expanded, section define a receiving opening 9 for the connector plug 5. The receiving opening 9 adjoins a fluid channel 10 enclosed by the conduit 2. Furthermore, the expanded section 7 has an edge 11 that is bent inward. Its front side faces the fluid channel 10 and forms a shoulder 12. The shoulder 12 has an annular abutment surface which, in the present exemplary embodiment, is flat. In so doing, said abutment surface is arranged concentric and at a right angle with respect to a central axis 13 of the receiving opening 9. Adjoining the shoulder 12 is an annular cylindrical surface 14 having a diameter that is slightly greater than the outside diameter of the section 8 of the connector plug 5, but significantly smaller than the inside diameter of the other section 7. Said latter section receives a sealing element 15 that has the form of an O-ring or the form of another suitable seal, for example.

The connector housing 6 is held by at least one, preferably more, detent elements or detent fingers 16, 17, 18 on the connector socket 4. To achieve this, these detent fingers extend in axial direction from an annular end surface of the connector housing 6 and enclose a passage opening 19 having an inside diameter in the region of the fingers 16, 17, 18 that is only minimally greater than the outside diameter of the section 8. In the region of the fingers 16, 17, 18, the passage opening 19 is bordered by a cylindrical wall.

All the fingers 16, 17, 18 have the same configuration. They are separated from each other by slits 21, 22 that extend in axial direction. The fingers 16, 17, 18 consist of the same plastic material as the connector housing 6 and are an integral part of said housing. They are slightly flexible and can thus spring radially inward. Each finger 16, 17, 18 has on its outside free end a head 23, 24, which is provided with an abutment surface 25, 26 on the side facing the shoulder 12. Said abutment surface is correspondingly aligned with the corresponding abutment surface of the shoulder 12. On its opposite side, the head 23, 24 is provided with an oblique surface 27, 28. The radial thickness of the head 23, 24 is greater than the radial width of the gap formed between the surface 14 and the generated surface of the section 8. Consequently, the fingers 16, 17, 18, in combination with the shoulder 12, form a locking means to secure the connector housing 6 to the connector socket 4.

Furthermore, the connector socket 6 has an essentially cylindrical exterior form. The passage opening 9 is provided with an annular groove 29 which has a stepped diameter. A first groove section has a relatively small diameter. An adjoining, second groove section 32 has a large diameter, while a third groove section 33 has a diameter that is between that of the first groove section 31 and that of the second groove section 32. Furthermore, the passage opening continues through to the front side 34 of the connector housing 6 at a diameter which is slightly greater than that of the section 8.

The annular groove 29 accommodates a locking ring 35 that is configured as a snap ring. This ring has essentially a circular form and has a slit. On its side facing the front side 34, said ring is provided with an oblique insertion surface 36. On its side opposite thereto, said ring is essentially flat. In relaxed state, said ring's inside diameter is preferably the same as, or slightly greater than, the outside diameter of the section 8. In relaxed state, the locking ring 35 takes on its smallest diameter. In so doing, it abuts against the shoulder formed by the groove sections 31, 32 and cannot enter the groove section 31. However, it can be moved into the groove section 33.

FIG. 3 shows the connector plug 5, in particular. Said plug encloses a fluid channel 37 and, for example, forms the end of a pipe that has been appropriately reformed. However, said plug may also consist of a separate part, which is subsequently joined to a line, such as, for example a metal pipe or a conduit of plastic material, by soldering, gluing or by other suitable joining techniques. On its free end, the connector plug 5 is provided with a conically tapering front section 38. This facilitates the insertion of the connector plug 5 in the connector socket 4. To achieve a cooperation with the locking ring 35, the connector plug 5 is provided with an annular rib 39 at a specific distance from the exterior conical front section 38, said rib being configured as a radial flange. Preferably, the rib 39 is produced by a reformation process (cold reformation), in the course of which the wall of the section 8 of the connector plug 5 forms an annular radially outward extending fold. This fold extends beyond the outside diameter of the section 8 and is distinctly greater than the inside diameter of the relaxed locking ring 35.

The so-far described connector device 1 is disposed to operate as follows:

It is assumed, as illustrated by FIG. 2, that a sealing element 5 has been placed in the connector socket 4 and that the connector housing 6 has been locked in position with the connector socket 4. To achieve this, the detent fingers 16, 17, 18 have been inserted in the receiving opening 9 of the connector socket 4 until the heads 23, 24 of the detent fingers 15, 17, 18 snap into position behind the shoulder 12. Now the section 8 (which is also referred to as an extension) of the connector plug 5 is inserted in the passage opening 19 of the connector housing 9 and moved through the passage opening 19 into the receiving opening 9 of the connector socket 4. This operation is illustrated by FIG. 3. In so doing, the extension or section 8 secures the detent fingers 16, 17, 18 in the gap formed between the outside circumferential surface of the section 8 and the inside circumferential surface of the edge. The heads 23, 24 are caught behind the shoulder 12 and thus prevent the connector housing 6 from being pulled off the connector socket 4.

Furthermore, the section 8 has compressed the sealing element 15 in radial direction and thus established fluid-tightness.

When the connector plug 5 is farther inserted into the connector housing 6 and the connector socket 4, the annular rib 39, as shown by FIG. 3, comes into abutment with the oblique insertion surface 36 of the locking ring 35. As the connector plug 5 is continued to be inserted in the connector housing 6, the ring 35 is expanded by doing so. When the rib 39 has passed the locking ring 35, said ring snaps back to its original diameter. Now the rib 39 transports the locking ring 35 into the groove section 33, as is obvious from FIG. 4. This latter section is narrower than the groove section 32 in which the locking ring 35 could previously expand. In so doing, the diameter of the groove section 33 is dimensioned small enough to hold the locking ring 35 with minimal play, yet prevent said ring from being expanded, as would be required in order to allow the rib 39 to pass toward the outside. Thus, the locking ring 35 secures the connector plug 5 in the connector housing 6. Once said connector housing itself has been locked in position to the connector socket 4 by means of the detent fingers 16, 17, 18, the connector plug 5 can no longer be pulled out of the connector housing 6 and the connector socket 4. In addition, the locking ring 35 centers the connector plug 5. Thus a secure and durable fluid-tight connection 2, 3 is established.

If the connector device 1 is to be opened, the locking ring 35 is pushed back into the groove section 32 by means of a release tool, e.g., in the form of a release sleeve, that is inserted in the annular gap 41 as shown in FIG. 4, and is held in said groove section. A firm pull on the connector plug 5 can achieve an expansion of the locking ring 35, as a result of which the connector plug 5 can be pulled out of the connector socket 4 and of the connector housing. As a result of this, the detent fingers 16, 17, 18 are released, thus making it possible to remove also the connector housing 6 from the connector socket 4, if necessary. The release sleeve may also be configured in such a manner that it, in turn, expands the locking ring 35 when said release sleeve is inserted in the gap remaining between the connector housing 6 and the connector plug 5, thus making it possible to pull the connector plug 5 more easily out of the connector socket 4.

FIGS. 5 through 7 show a modified embodiment of the connector device 1; the above description and the same reference numbers apply accordingly. Different from the above description, the detent fingers 16, 17, 18, when in relaxed state, however, do not extend in axial direction but, as shown by FIG. 5, at an acute angle relative to the central axis 13. This can make the separation of the connector housing 6 from the connector socket 4 easier, as long as the connector plug 5 is not inserted in the connector socket 4. However, if said plug is inserted, as shown by FIG. 6, and also properly locked in position in the connector housing 6, as shown by FIG. 7, the detent fingers 16, 17, 18 are displaced radially outward and thus held behind the shoulder 12. In this state, a separation of the connector socket 4 and the connector housing 6 from each other is not possible.

Figure 8:
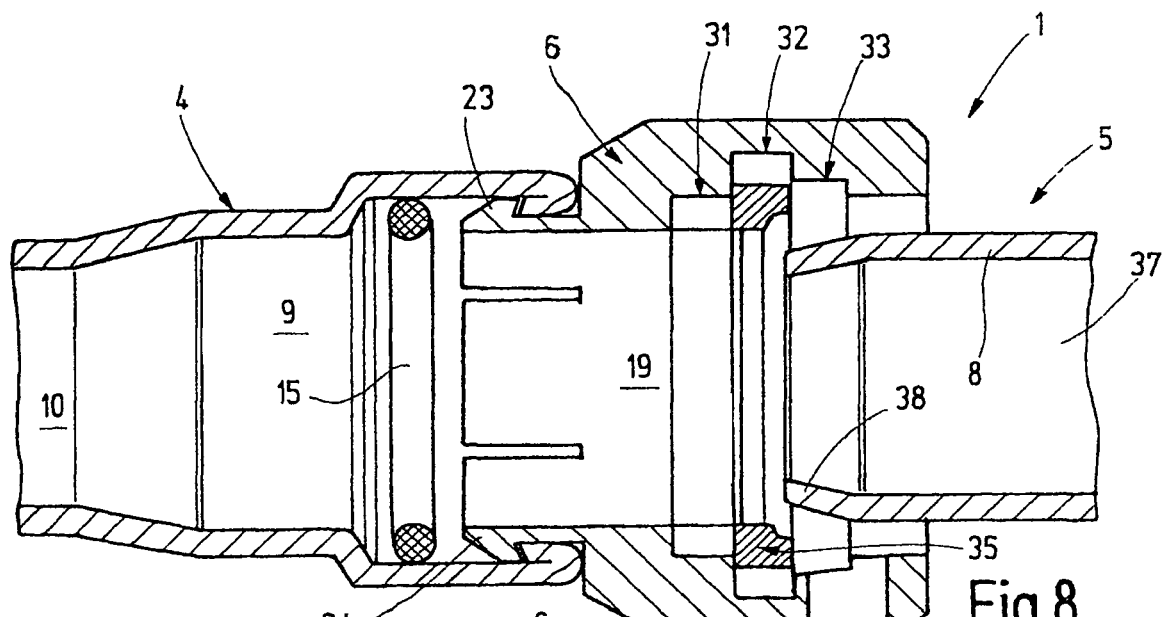
FIG. 8 an illustration, in longitudinal section, of another modified embodiment of the connector device in accordance with FIG. 1, before the insertion of the connector plug in the connector socket.
Figure 9:
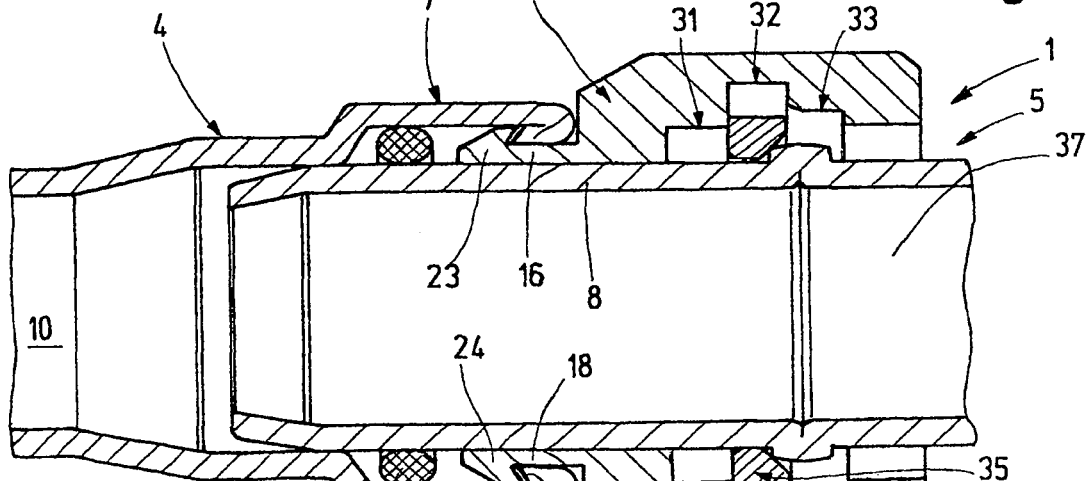
FIG. 9 an illustration, in longitudinal section, of the connector device in accordance with FIG. 8, during the insertion of the connector plug in the connector socket.
Figure 10:
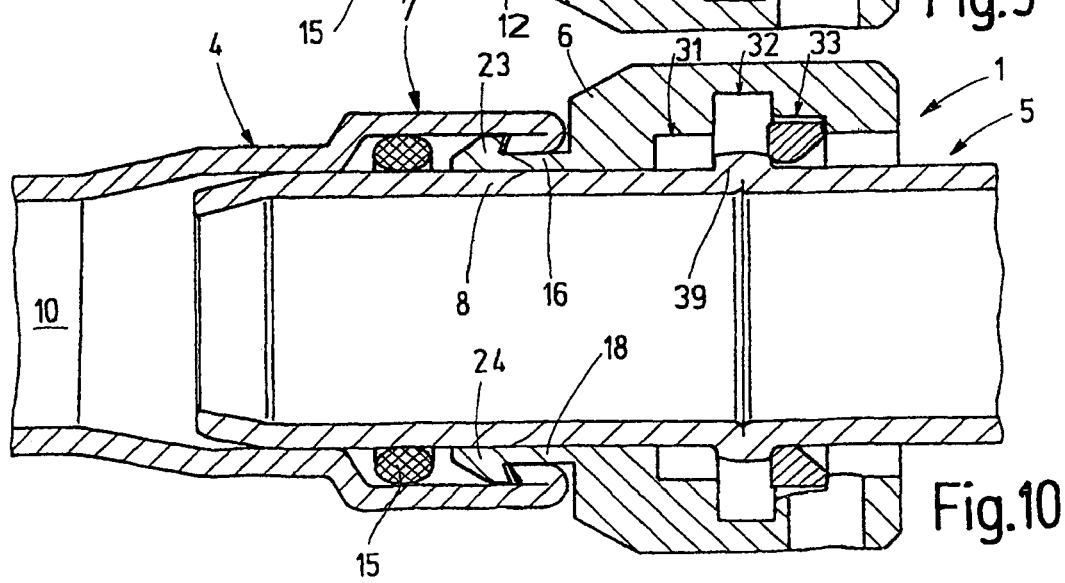
FIG. 10 an illustration, in longitudinal section, of the connector device in accordance with FIG. 8, in assembled state.

FIGS. 8 through 10 show another embodiment of the connector device 1 to which apply the description and the same reference numbers given for FIGS. 1 through 4. Different from the above description, the only additional feature that still applies is that the shoulder 12 has a conical abutment surface having a cone angle that widens away from the connector socket 4 and the fluid channel 10. The heads 23, 24 of the detent fingers 16, 18, as well as the remaining not illustrated detent fingers, form the barbs that hold the connector housing 6 on the connector socket 4 even when the connector plug 5 has been pulled out of the passage opening 19. In addition, the section 8, as is obvious from FIGS. 9 and 10, lock the connector housing 6 to the connector socket 4 in that said section ensures that the detent fingers 16, 17, 18 are held in their radially outward position.

Figure 11:
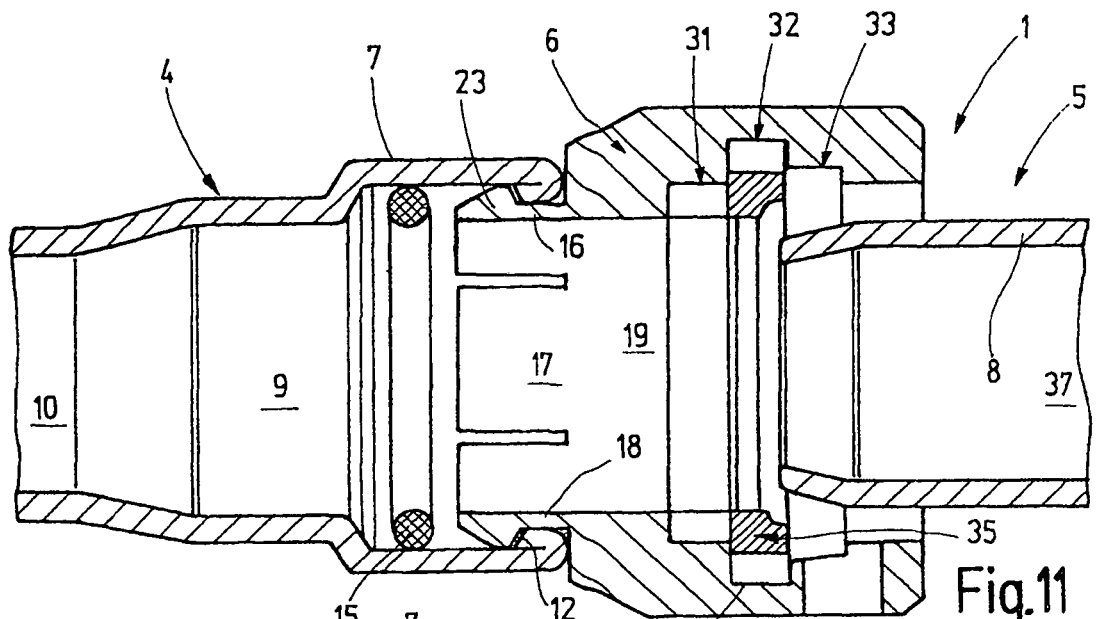
FIG. 11 an illustration, in longitudinal section, of another modified embodiment of the connector device in accordance with FIG. 1, before the insertion of the connector plug in the connector socket.
Figure 12:
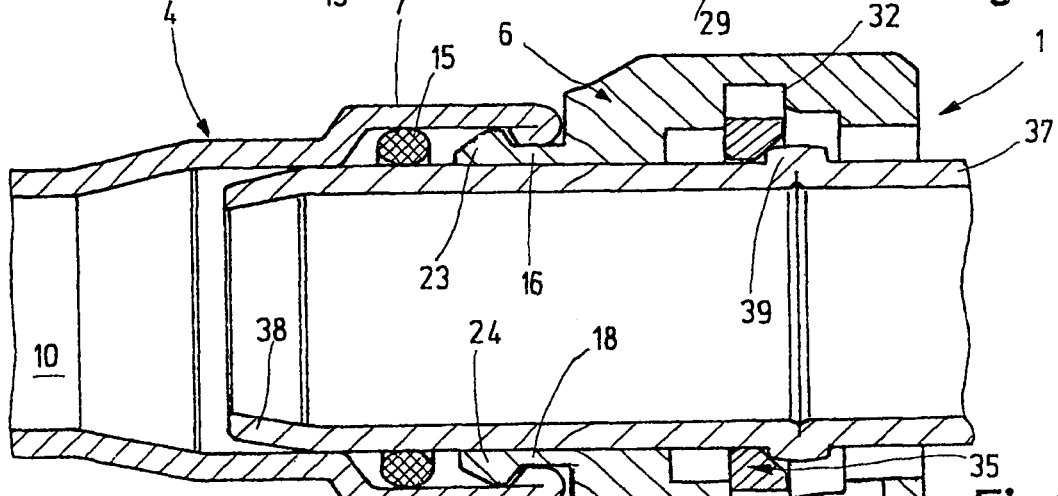
FIG. 12 an illustration, in longitudinal section, of the connector device in accordance with FIG. 1, during the insertion of the connector plug in the connector socket.
Figure 13:
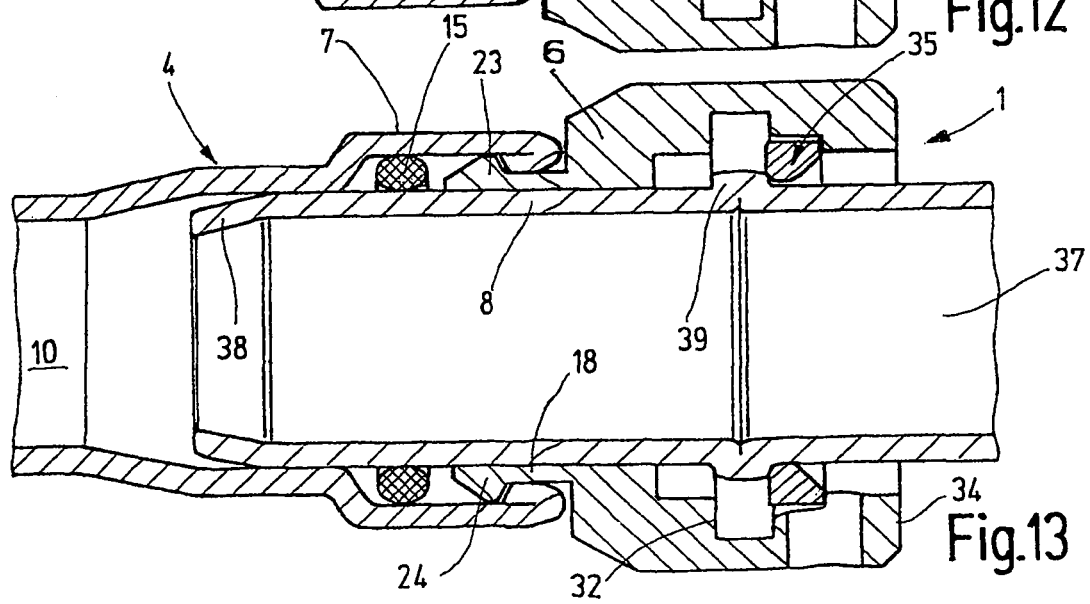
FIG. 13 an illustration, in longitudinal section, of the connector device in accordance with FIG. 1, in assembled state.

FIGS. 11 through 13 illustrate another embodiment; the description and reference numbers of FIGS. 1 through 4 apply. In addition, it applies that the shoulder 12 has a conical abutment surface. The cone angle subtended by this conical abutment surface opens inward toward the fluid channel 10. The corresponding abutment surfaces of the detent fingers 16, 17, 18 that abut against the shoulder 12 are appropriately inclined. In so doing, the connector housing 6 can be pulled off the connector socket 4, as long as the connector plug 5 is not inserted through the passage opening 19 into the connector socket 4. However, as soon as the section 8 has passed through the region of the detent fingers 16, 17, 18, these fingers are fixed in position in their radially outward position as shown by FIG. 12. If the connector device 1, as shown by FIG. 13, is properly assembled, it cannot be disassembled by axially or radially acting forces. It can only be disassembled in that the locking ring 35, as described farther above, is moved into the groove section 32 and expanded there, and in that the connector plug 5 is then pulled out of the connector housing 6. Axial pulling forces or bending moments occurring during operation between the connector socket 4 and the connector plug 5, or forces due to fluid pressure, cannot effect the opening of the plug-in connection.

Figure 14:
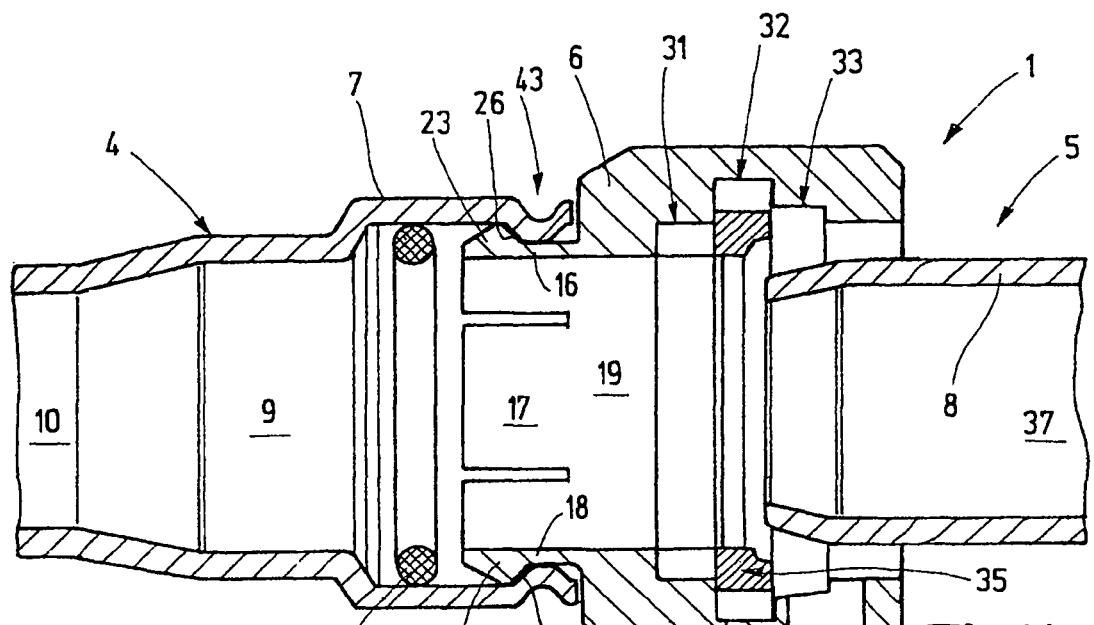
FIG. 14 an illustration, in longitudinal section, of another modified embodiment with modified connector socket of the connector device in accordance with FIG. 1, before insertion of the connector plug in the connector socket.
Figure 15:
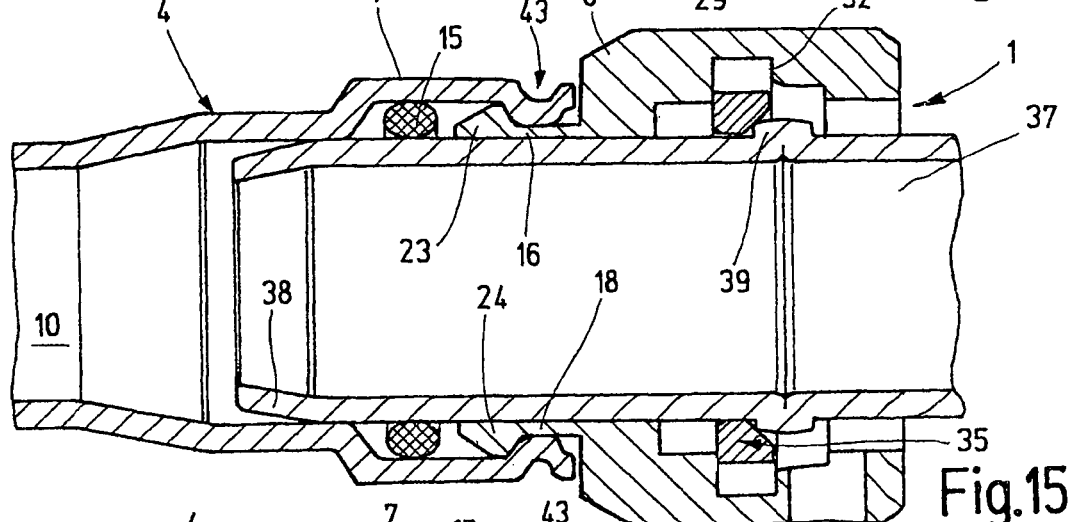
FIG. 15 an illustration, in longitudinal section, of the connector device in accordance with FIG. 14, during the insertion of the connector plug in the connector socket; and, FIG. 16 an illustration, in longitudinal section, of the connector device in accordance with FIGS. 14 and 15, in assembled state.
Figure 16:
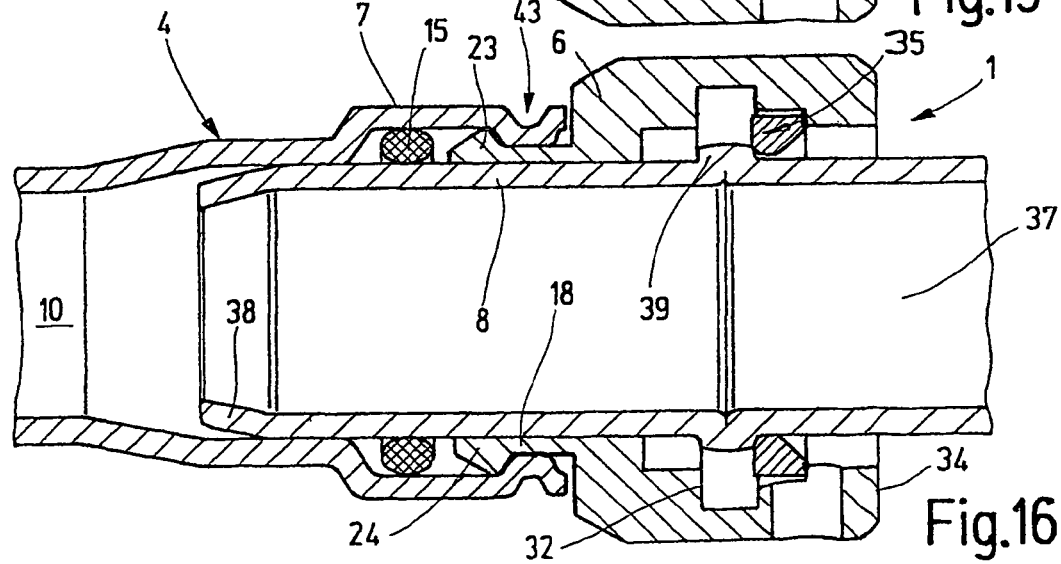

FIGS. 14 through 16 illustrate another embodiment of the connector device 1; in this case the description relating in particular to FIGS. 1 through 4 and, in addition, the description relating to FIGS. 11 through 13 are applicable. The special feature of this embodiment in accordance with FIGS. 14 through 16 is the configuration of the shoulder 12. Referring to all of the aforementioned embodiments, this was preferably achieved by cold reformation of the outer edge of the connector socket 4 enclosing the receiving opening 9. A well-defined shoulder can be produced with an inward beaded edge, as is required. However, the requirements in view of manufacturing technology and material quality regarding the connector socket 4 are considerable. The requirements in view of the deformability of the material of the connector socket 4 and in view of the process management during reformation are less stringent considering the embodiment shown by FIGS. 14 through 16. The shoulder 12 is formed by a suitable annular bead 43 that may have a round cross-section or, as illustrated, a preferably approximately trapezoid cross-section. Preferably, again the configuration and slope of the abutment surface 26 of the respective detent fingers 16, 17, 18 are adapted to the configuration and slope of the corresponding surface of the shoulder 12 facing the heads 23, 24. The annular bead 43, as illustrated, can be open toward the outside or also be closed by stronger upsetting, so that said bead is configured approximately like the rib, however, is directed radially inward. The connector socket 4 may terminate with the bead 43 or it may continue a short distance to form a pipe extension in order to additionally stabilize the bead 43.

The advantage of this embodiment is that the shape of the connector socket 4 can be manufactured easily by a cold reformation process, such as, for example, an upsetting process, a rolling process or a combined upsetting/rolling process. The connector socket 4 can be formed on a pipe end of a metal pipe, without requiring the joining of additional parts, such as turned parts or the like, to the pipe. The same applies to the connector plug 5. Consequently, the connector socket 4 and the connector plug 5 are preferably an integral one-piece part of the respective conduit 2, 3, in that they simply are molded to the open ends of the conduits. The inventive connector device 1 comprises a connector socket 4, a connector housing 6 and a connector plug 5. The connector socket 4 and the connector plug 5 are simply formed in such a manner that they can be produced by cold reformation on the pipe ends. The connector housing 6 is preferably a simple plastic part that can be produced by injection-moulding. The detent elements 12, 16, 17, 18 lock the connector housing 6 to the connector socket 4. The connector plug 5, in turn, secures the detent elements 12, 16, 17, 18 in locked position, so that the connector housing 6 cannot detach from the connector socket 4, as long as the connector plug 5 is plugged in the connector socket 4. A locking ring 35, in turn, locks the connector plug 5 in the connector housing 6. If required, the locking ring 35 can be arranged and configured in such a manner that it can be moved into its release position by means of a release tool.

What is claimed:

1. A connector device for pressurized fluid conduits, comprising:
    a connector socket including a receiving opening, an expanded section, and an inward directed shoulder with an inwardly bent edge;
    a connector plug including a tubular extension having a fluid channel, whereby the extension can be inserted in the receiving opening and has an outside circumferential surface defining a gap with the shoulder; and
    a connector housing including a passage opening for the insertion of the connector plug, and which is provided with a locking means for axially locking the connector plug in the connector housing, and which has, on its front side facing the connector socket, at least one detent element that cooperates with the connector socket;
    wherein, in relaxed state, the detent fingers are inclined toward the central axis of the passage opening.

2. The connector device of claim 1, wherein the at least one detent element is associated with at least one detent finger, which has, on its free end, a stop projection having a radial thickness that is greater than the radial width of the gap.

3. The connector device of claim 2, wherein the detent finger is connected in one piece with the connector housing.

4. The connector device of claim 1, wherein the connector housing is comprised of plastic material.

5. The connector device of claim 1, wherein the connector housing comprises several detent fingers that extend axially from the connector housing and are distributed around the passage opening.

6. The connector device of claim 1, wherein, in relaxed state, the detent fingers extend in a radial direction.

7. The connector device of claim 1, wherein the shoulder has an abutment surface that is oriented at a right angle with respect to the central axis of the receiving opening.

8. The connector device of claim 1, wherein the shoulder has an abutment surface that is oriented at an acute angle with respect to the central axis of the receiving opening.

9. The connector device of claim 1, wherein the shoulder is an annular shoulder.

10. The connector device of claim 1, wherein the gap is an annular gap.

11. The connector device of claim 1, wherein the connector housing and the connector plug together define a gap for the insertion of a release sleeve.

12. The connector device of claim 1, wherein the connector socket has a receiving space for a sealing element.

13. A connector device for pressurized fluid conduits, comprising:
- a connector socket including a receiving opening, an expanded section, and an inward directed shoulder with an inwardly bent edge;
- a connector plug including a tubular extension having a fluid channel, whereby the extension can be inserted in the receiving opening and has an outside circumferential surface defining a gap with the shoulder; and
- a connector housing including a passage opening for the insertion of the connector plug, and which is provided with a locking means for axially locking the connector plug in the connector housing, and which has, on its front side facing the connector socket, at least one detent element that cooperates with the connector socket; wherein the locking means is a snap ring that cooperates with a radial projection provided on the connector plug.

14. The connector device of claim 13, wherein the snap ring is associated with an annular groove in the passage opening.

15. The connector device of claim 14, wherein the annular groove has a groove section having a larger diameter and an axially offset section having a smaller diameter.

16. The connector device of claim 13, wherein the snap ring has an oblique insertion surface.

17. A connector device, comprising:
- a connector socket including a receiving opening, an expanded section, and an inward directed shoulder with an inwardly bent edge;
- a connector plug including a tubular extension having a fluid channel, whereby the extension can be inserted in the receiving opening and has an outside circumferential surface defining a gap with the shoulder;
- a connector housing comprised of plastic, the connector housing including a passage opening for receiving the connector plug, the connector housing having, on its side facing the connector socket, at least one detent element that cooperates with the connector socket; and
- a locking ring for axially locking the connector plug in the connector housing, wherein the locking ring comprises a snap ring that cooperates with a radial projection provided on the connector plug.

18. The connector device of claim 17, including at least one detent finger with a stop projection, the detent finger being associated with at least one detent element.

19. A connector device for pressurized fluid conduits, comprising:
- a connector socket including a receiving opening, an expanded section, and an inward directed shoulder with an inwardly bent edge;
- a connector plug including a tubular extension having a fluid channel, whereby the extension can be inserted in the receiving opening and has an outside circumferential surface defining a gap with the shoulder; and
- a connector housing including a passage opening for the insertion of the connector plug, and which is provided with a locking means for axially locking the connector plug in the connector housing, and which has, on its front side facing the connector socket, at least one detent element that cooperates with the connector socket;
- wherein the shoulder has an abutment surface that is oriented at an acute angle with respect to the central axis of the receiving opening.

* * * * *